(12) United States Patent
Schellekens et al.

(10) Patent No.: US 10,948,152 B2
(45) Date of Patent: *Mar. 16, 2021

(54) LIGHTING SYSTEMS OF TAILGATES WITH PLASTIC GLAZING

(71) Applicant: SABIC Global Technologies B.V., Bergen op Zoom (NL)

(72) Inventors: Geert Jan Schellekens, Glize (NL); Matteo Terragni, Misinto (IT); Augustinus Gregorius Henricus Meijers, Breda (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,524

(22) Filed: Jun. 22, 2020

(65) Prior Publication Data

US 2020/0318807 A1 Oct. 8, 2020

Related U.S. Application Data

(63) Continuation of application No. 15/756,613, filed as application No. PCT/IB2016/055338 on Sep. 7, 2016, now Pat. No. 10,690,314.

(Continued)

(51) Int. Cl.
*B60Q 1/30* (2006.01)
*B32B 27/08* (2006.01)
(Continued)

(52) U.S. Cl.
CPC ......... *F21S 43/26* (2018.01); *B29C 45/14811* (2013.01); *B32B 3/08* (2013.01);
(Continued)

(58) Field of Classification Search
CPC . B32B 3/26; B32B 27/365; B29C 45/114811; B60Q 1/302; F21S 43/26
See application file for complete search history.

(56) References Cited

U.S. PATENT DOCUMENTS 4,551,484 A 11/1985 Radisch et al.
4,558,634 A 12/1985 Oshiro et al.
(Continued)

FOREIGN PATENT DOCUMENTS

CA 2762401 A 6/2012
CN 1668461 A 9/2005
(Continued)

OTHER PUBLICATIONS

U.S. Appl. No. 61/935,718, filed Feb. 4, 2014.
(Continued)

*Primary Examiner* — Karabi Guharay
(74) *Attorney, Agent, or Firm* — Cantor Colburn LLP

(57) ABSTRACT

A plastic glazing of a tailgate of a vehicle is provided, the plastic glazing comprising: a first translucent component; a second translucent component molded onto the first translucent component, wherein the second translucent component comprises a color, wherein the plastic glazing is of one-piece molded plastic construction, wherein an overlapping portion of the first translucent component and the second translucent component forms a lens of a first molded light assembly.

14 Claims, 8 Drawing Sheets

Related U.S. Application Data

(60) Provisional application No. 62/215,082, filed on Sep. 7, 2015.

(51) Int. Cl.

| | | |
|---|---|---|
| *F21S 43/20* | (2018.01) | |
| *B29C 45/14* | (2006.01) | |
| *B60Q 1/26* | (2006.01) | |
| *B60J 5/04* | (2006.01) | |
| *B60J 5/10* | (2006.01) | |
| *B32B 27/30* | (2006.01) | |
| *B32B 7/04* | (2019.01) | |
| *B32B 3/26* | (2006.01) | |
| *B32B 27/12* | (2006.01) | |
| *B32B 3/08* | (2006.01) | |
| *B32B 7/08* | (2019.01) | |
| *B32B 7/12* | (2006.01) | |
| *B60J 1/18* | (2006.01) | |
| *B32B 27/36* | (2006.01) | |
| *B29K 69/00* | (2006.01) | |
| *B29L 31/30* | (2006.01) | |

(52) U.S. Cl.
CPC .......... *B32B 3/26* (2013.01); *B32B 7/04* (2013.01); *B32B 7/08* (2013.01); *B32B 7/12* (2013.01); *B32B 27/08* (2013.01); *B32B 27/12* (2013.01); *B32B 27/308* (2013.01); *B32B 27/365* (2013.01); *B60J 1/18* (2013.01); *B60J 1/1838* (2013.01); *B60J 5/0481* (2013.01); *B60J 5/107* (2013.01); *B60Q 1/268* (2013.01); *B60Q 1/302* (2013.01); *B29K 2069/00* (2013.01); *B29K 2995/0029* (2013.01); *B29L 2031/30* (2013.01); *B32B 2250/02* (2013.01); *B32B 2250/03* (2013.01); *B32B 2260/021* (2013.01); *B32B 2260/046* (2013.01); *B32B 2262/101* (2013.01); *B32B 2307/40* (2013.01); *B32B 2307/402* (2013.01); *B32B 2307/414* (2013.01); *B32B 2307/538* (2013.01); *B32B 2605/00* (2013.01)

(56) References Cited

U.S. PATENT DOCUMENTS

| | | |
|---|---|---|
| 4,609,688 A | 9/1986 | Radisch et al. |
| 4,636,698 A | 1/1987 | Leclercq |
| 4,645,970 A | 2/1987 | Murphy |
| 4,712,287 A | 12/1987 | Johnston |
| 4,765,672 A | 8/1988 | Weaver |
| 4,775,402 A | 10/1988 | Letemps et al. |
| 4,778,366 A | 10/1988 | Weaver |
| 4,792,425 A | 12/1988 | Weaver |
| 4,871,385 A | 10/1989 | Lecourt et al. |
| 4,888,072 A | 12/1989 | Ohlenforst et al. |
| 5,060,440 A | 10/1991 | Weaver |
| 5,071,709 A | 12/1991 | Berquier et al. |
| 5,324,374 A | 6/1994 | Harmand et al. |
| 5,443,862 A | 8/1995 | Buffat et al. |
| 5,451,090 A | 9/1995 | Brodie et al. |
| 5,495,400 A | 2/1996 | Currie |
| 5,505,023 A | 4/1996 | Gillen et al. |
| 5,508,585 A | 4/1996 | Butt |
| 5,637,363 A | 6/1997 | Leray et al. |
| 5,669,693 A | 9/1997 | Smith |
| 5,726,953 A | 3/1998 | Lapointe et al. |
| 5,757,127 A | 5/1998 | Inoguchi et al. |
| 5,772,304 A | 6/1998 | Smith |
| 5,776,603 A | 7/1998 | Zagdoun et al. |
| 5,780,965 A | 7/1998 | Cass et al. |
| 5,807,515 A | 9/1998 | Fisher et al. |
| 5,857,770 A | 1/1999 | Fohl et al. |
| 5,887,393 A | 3/1999 | Vanark et al. |
| 5,890,796 A | 4/1999 | Marinelli et al. |
| 5,965,981 A | 10/1999 | Inoguchi et al. |
| 6,054,189 A | 4/2000 | Bravet et al. |
| 6,106,931 A | 8/2000 | Ito et al. |
| 6,224,135 B1 | 5/2001 | Rehkopf |
| 6,241,302 B1 | 6/2001 | Rehkopf |
| 6,432,332 B1 | 8/2002 | Matsco et al. |
| 6,461,028 B1 | 10/2002 | Huang |
| 6,468,677 B1 | 10/2002 | Benton et al. |
| 6,536,930 B1 | 3/2003 | Hirmer |
| 6,585,402 B2 | 7/2003 | Ohkodo et al. |
| 6,627,319 B2 | 9/2003 | Jacquiod et al. |
| 6,660,968 B1 | 12/2003 | Mottelet et al. |
| 6,747,779 B1 | 6/2004 | Morin et al. |
| 6,811,857 B1 | 11/2004 | Bravet et al. |
| 6,811,895 B2 | 11/2004 | Murasko et al. |
| 6,852,393 B2 | 2/2005 | Gandon |
| 6,872,453 B2 | 3/2005 | Arnaud et al. |
| 6,908,204 B2 | 6/2005 | Kraft |
| 6,965,196 B2 | 11/2005 | Murasko et al. |
| 7,012,728 B2 | 3/2006 | Morin et al. |
| 7,018,057 B2 | 3/2006 | Richard |
| 7,024,822 B2 | 4/2006 | Scheer et al. |
| 7,025,482 B2 | 4/2006 | Yamashita et al. |
| 7,026,577 B2 | 4/2006 | Maeuser et al. |
| 7,048,400 B2 | 5/2006 | Murasko et al. |
| 7,048,422 B1 | 5/2006 | Solomon |
| 7,048,423 B2 | 5/2006 | Stepanenko et al. |
| 7,100,328 B2 | 9/2006 | Scheer et al. |
| 7,144,289 B2 | 12/2006 | Murasko et al. |
| 7,172,322 B2 | 2/2007 | Pommeret et al. |
| 7,265,889 B2 | 9/2007 | Morin et al. |
| 7,270,863 B2 | 9/2007 | Harima et al. |
| 7,290,906 B2 | 11/2007 | Suzuki et al. |
| 7,311,976 B2 | 12/2007 | Arnaud et al. |
| 7,318,663 B2 | 1/2008 | Verbrugh et al. |
| 7,469,450 B2 | 12/2008 | Gipson |
| 7,500,774 B2 | 3/2009 | Nishiyama et al. |
| 7,553,536 B1 | 6/2009 | Naoumenko et al. |
| 7,584,689 B2 | 9/2009 | Jones et al. |
| 7,654,721 B2 | 2/2010 | Okada |
| 7,686,489 B2 | 3/2010 | Ajiki et al. |
| 7,712,933 B2 | 5/2010 | Fleischmann et al. |
| 7,745,018 B2 | 6/2010 | Murasko et al. |
| 7,793,580 B2 | 9/2010 | Jones et al. |
| 7,806,538 B2 | 10/2010 | Ajiki et al. |
| 7,815,345 B2 | 10/2010 | Misawa et al. |
| 7,857,495 B2 | 12/2010 | Misawa et al. |
| 7,883,249 B2 | 2/2011 | Totani et al. |
| 7,892,661 B2 | 2/2011 | Boire et al. |
| 7,922,374 B2 | 4/2011 | Schwab et al. |
| 7,929,194 B2 | 4/2011 | Legois et al. |
| 7,985,011 B2 | 7/2011 | Ajiki et al. |
| 8,007,152 B2 | 8/2011 | Nakabayashi |
| 8,025,004 B2 | 9/2011 | Jones et al. |
| 8,044,415 B2 | 10/2011 | Messere et al. |
| 8,057,615 B2 | 11/2011 | Grussaute-Nghiem et al. |
| 8,083,388 B2 | 12/2011 | Sun et al. |
| 8,179,034 B2 | 5/2012 | Potts et al. |
| 8,226,282 B2 | 7/2012 | Kazaoka et al. |
| 8,297,168 B2 | 10/2012 | Jones et al. |
| 8,298,032 B2 | 10/2012 | Potts et al. |
| 8,303,147 B2 | 11/2012 | Jeon |
| 8,314,546 B2 | 11/2012 | Tchakarov |
| 8,317,381 B2 | 11/2012 | Heidinger |
| 8,339,040 B2 | 12/2012 | Bruton et al. |
| 8,349,445 B2 | 1/2013 | Jacquiod et al. |
| 8,384,520 B2 | 2/2013 | Fourreau |
| 8,403,399 B2 | 3/2013 | Kuntze et al. |
| 8,408,773 B2 | 4/2013 | Judge |
| 8,471,177 B2 | 6/2013 | Chaussade et al. |
| 8,550,536 B2 | 10/2013 | Gachter et al. |
| 8,585,263 B2 | 11/2013 | Shipman |
| 8,622,458 B2 | 1/2014 | Hache |
| 8,641,257 B2 | 2/2014 | Richardson |
| 8,646,829 B2 | 2/2014 | Crane et al. |
| 8,690,220 B2 | 4/2014 | Tsukiyama et al. |
| 8,697,186 B2 | 4/2014 | Zagdoun et al. |

(56) References Cited

U.S. PATENT DOCUMENTS

| | | | |
|---|---|---|---|
| 8,727,422 B2 | 5/2014 | Iwabuchi et al. | |
| 8,808,790 B2 | 8/2014 | Zagdoun et al. | |
| 8,829,539 B2 | 9/2014 | Kleo et al. | |
| 9,006,751 B2 | 4/2015 | Kleo et al. | |
| 9,090,120 B2 | 7/2015 | Pires et al. | |
| 9,210,771 B2 | 12/2015 | Day | |
| 9,637,184 B1 | 5/2017 | Bennett et al. | |
| 9,821,862 B2 | 11/2017 | Han et al. | |
| 9,902,437 B2 | 2/2018 | Demange et al. | |
| 10,690,314 B2* | 6/2020 | Schellekens | B32B 3/26 |
| 2002/0037421 A1 | 3/2002 | Arnaud et al. | |
| 2004/0005472 A1 | 1/2004 | Arnaud et al. | |
| 2004/0191618 A1 | 9/2004 | Morin et al. | |
| 2004/0218400 A1 | 11/2004 | Egashira | |
| 2004/0265512 A1 | 12/2004 | Aengenheyster et al. | |
| 2005/0045613 A1 | 3/2005 | Maeuser et al. | |
| 2005/0147825 A1 | 7/2005 | Arnaud et al. | |
| 2005/0168013 A1 | 8/2005 | Rinklin | |
| 2005/0242721 A1 | 11/2005 | Foust et al. | |
| 2006/0005484 A1 | 1/2006 | Riblier et al. | |
| 2006/0033978 A1 | 2/2006 | Morin et al. | |
| 2006/0210772 A1 | 9/2006 | Bui et al. | |
| 2006/0210778 A1 | 9/2006 | Benyahia et al. | |
| 2007/0026235 A1 | 2/2007 | Chen et al. | |
| 2007/0068375 A1 | 3/2007 | Jones et al. | |
| 2007/0068376 A1 | 3/2007 | Jones et al. | |
| 2007/0157671 A1 | 7/2007 | Thellier et al. | |
| 2008/0241523 A1 | 10/2008 | Huignard et al. | |
| 2008/0254299 A1 | 10/2008 | Blackburn et al. | |
| 2008/0264930 A1 | 10/2008 | Mennechez et al. | |
| 2009/0110918 A1 | 4/2009 | Jacquiod et al. | |
| 2009/0308239 A1 | 12/2009 | Jones et al. | |
| 2010/0026045 A1 | 2/2010 | Thomas | |
| 2010/0061093 A1 | 3/2010 | Janssen et al. | |
| 2010/0288117 A1 | 11/2010 | Jones et al. | |
| 2011/0033667 A1 | 2/2011 | Leconte et al. | |
| 2011/0061302 A1 | 3/2011 | Barral et al. | |
| 2011/0240343 A1 | 10/2011 | Zagdoun et al. | |
| 2011/0241376 A1 | 10/2011 | Igura | |
| 2011/0248219 A1 | 10/2011 | Zagdoun et al. | |
| 2011/0250387 A1 | 10/2011 | Zagdoun et al. | |
| 2012/0001027 A1 | 1/2012 | Jones et al. | |
| 2012/0153670 A1 | 6/2012 | Crane et al. | |
| 2012/0229907 A1 | 9/2012 | Ueda | |
| 2012/0248814 A1 | 10/2012 | Tsukiyama et al. | |
| 2012/0280533 A1 | 11/2012 | Gachter et al. | |
| 2012/0320621 A1 | 12/2012 | Kleo et al. | |
| 2013/0033894 A1 | 2/2013 | Kleo et al. | |
| 2013/0051049 A1 | 2/2013 | Sato | |
| 2013/0135885 A1 | 5/2013 | Anzai | |
| 2013/0182451 A1 | 7/2013 | Oba et al. | |
| 2013/0201709 A1 | 8/2013 | Natsume | |
| 2013/0280452 A1 | 10/2013 | Nawroth et al. | |
| 2013/0293105 A1 | 11/2013 | Day | |
| 2013/0313601 A1 | 11/2013 | Aeling et al. | |
| 2013/0314935 A1 | 11/2013 | Tokieda et al. | |
| 2014/0003076 A1 | 1/2014 | Suganumata et al. | |
| 2014/0077525 A1 | 3/2014 | Yoshimura et al. | |
| 2014/0110964 A1 | 4/2014 | Schijve et al. | |
| 2014/0327269 A1 | 11/2014 | Agius et al. | |
| 2015/0084370 A1 | 3/2015 | Newberry et al. | |
| 2015/0153014 A1 | 6/2015 | Salter et al. | |
| 2015/0274223 A1 | 10/2015 | Wolf et al. | |
| 2017/0301981 A1 | 10/2017 | Niihara et al. | |
| 2018/0050741 A1 | 2/2018 | Wolf et al. | |
| 2018/0112847 A1 | 4/2018 | Childress et al. | |
| 2018/0186220 A1 | 7/2018 | Leterrier et al. | |
| 2018/0236699 A1 | 8/2018 | Schellekens et al. | |
| 2018/0244136 A1 | 8/2018 | Schellekens et al. | |
| 2018/0251166 A1 | 9/2018 | Escoffier et al. | |
| 2018/0252382 A1 | 9/2018 | Schellekens et al. | |

FOREIGN PATENT DOCUMENTS

| | | |
|---|---|---|
| CN | 101130292 A | 2/2008 |
| CN | 201566450 U | 9/2010 |
| CN | 102245431 A | 11/2011 |
| CN | 103477252 A | 12/2013 |
| CN | 102458890 B | 5/2014 |
| CN | 103772921 A | 5/2014 |
| CN | 203655050 U | 6/2014 |
| CN | 203713981 U | 7/2014 |
| CN | 203844852 U | 9/2014 |
| CN | 104943603 A | 9/2015 |
| DE | 19706043 A1 | 6/1998 |
| DE | 69617705 T2 | 8/2002 |
| DE | 10147537 A1 | 4/2003 |
| DE | 69530806 T2 | 4/2004 |
| DE | 69929597 T2 | 9/2006 |
| DE | 60025815 T2 | 11/2006 |
| DE | 60027335 T2 | 1/2007 |
| DE | 60219518 T2 | 1/2008 |
| DE | 102008004942 | 6/2009 |
| DE | 102009058788 A1 | 6/2011 |
| DE | 202011110333 U1 | 8/2013 |
| EP | 0266514 A2 | 5/1988 |
| EP | 0267331 A1 | 5/1988 |
| EP | 0235447 B1 | 2/1994 |
| EP | 0453092 B1 | 8/1994 |
| EP | 0671864 A2 | 9/1995 |
| EP | 1000809 A1 | 5/2000 |
| EP | 1437215 A1 | 7/2004 |
| EP | 1494062 A2 | 1/2005 |
| EP | 1787841 A2 | 5/2007 |
| EP | 1892182 A1 | 2/2008 |
| EP | 1950492 A1 | 7/2008 |
| EP | 1992478 A1 | 11/2008 |
| EP | 2005226 A1 | 12/2008 |
| EP | 1261557 B1 | 11/2009 |
| EP | 2219862 A1 | 8/2010 |
| EP | 2275770 A1 | 1/2011 |
| EP | 2275771 A1 | 1/2011 |
| EP | 2275772 A1 | 1/2011 |
| EP | 2287557 A1 | 2/2011 |
| EP | 1824696 B1 | 1/2012 |
| EP | 2574142 A1 | 3/2013 |
| EP | 1897412 B1 | 12/2013 |
| FR | 2792628 A1 | 10/2000 |
| FR | 2863210 A1 | 6/2005 |
| FR | 2884148 B1 | 9/2007 |
| FR | 2961151 B1 | 6/2012 |
| FR | 2968631 A1 | 6/2012 |
| FR | 2996803 A1 | 4/2014 |
| GB | 1329505 A | 9/1973 |
| GB | 1480193 A | 7/1977 |
| GB | 2442364 A | 4/2008 |
| GB | 2513620 A | 11/2014 |
| JP | H08-050933 A | 2/1996 |
| JP | H08-207204 A | 8/1996 |
| JP | 2584764 B2 | 2/1997 |
| JP | H10-036706 A | 2/1998 |
| JP | H10-180183 A | 7/1998 |
| JP | 10-329165 A | 12/1998 |
| JP | 2000-233951 A | 8/2000 |
| JP | 2000-301985 A | 10/2000 |
| JP | 2002-518207 A | 6/2002 |
| JP | 2002-533233 A | 10/2002 |
| JP | 2002-543027 A | 12/2002 |
| JP | 2003-513840 A | 4/2003 |
| JP | 3445860 B2 | 9/2003 |
| JP | 2003-529462 A | 10/2003 |
| JP | 2004-534667 A | 11/2004 |
| JP | 2005-511473 A | 4/2005 |
| JP | 3741461 B2 | 2/2006 |
| JP | 3961583 B2 | 8/2007 |
| JP | 2008-528329 A | 7/2008 |
| JP | 2008-543706 A | 12/2008 |
| JP | 2008-545465 A | 12/2008 |
| JP | 2009-500271 A | 1/2009 |
| JP | 2009-512977 A | 3/2009 |
| JP | 4242743 B2 | 3/2009 |

(56) References Cited

FOREIGN PATENT DOCUMENTS

| | | |
|---|---|---|
| JP | 4251678 B2 | 4/2009 |
| JP | 4440641 B2 | 3/2010 |
| JP | 2010-188792 A | 9/2010 |
| JP | 2010-247676 A | 11/2010 |
| JP | 2010-260519 A | 11/2010 |
| JP | 2011-051544 A | 3/2011 |
| JP | 2011-057188 A | 3/2011 |
| JP | 2011-514849 A | 5/2011 |
| JP | 2011-121479 A | 6/2011 |
| JP | 2011-126388 A | 6/2011 |
| JP | 4700804 B2 | 6/2011 |
| JP | 2011-136606 A | 7/2011 |
| JP | 4754044 B2 | 8/2011 |
| JP | 4771262 B2 | 9/2011 |
| JP | 2011-219000 A | 11/2011 |
| JP | 2012-030654 A | 2/2012 |
| JP | 2012-503716 A | 2/2012 |
| JP | 2012-503852 A | 2/2012 |
| JP | 2012-046109 A | 3/2012 |
| JP | 2012-061957 A | 3/2012 |
| JP | 2012-131375 A | 7/2012 |
| JP | 5015764 B2 | 8/2012 |
| JP | 2012-206612 A | 10/2012 |
| JP | 2012-206614 A | 10/2012 |
| JP | 5054376 B2 | 10/2012 |
| JP | 5107242 B2 | 12/2012 |
| JP | 2013-006570 A | 1/2013 |
| JP | 5128733 B2 | 1/2013 |
| JP | 2013-056669 A | 3/2013 |
| JP | 5160900 B2 | 3/2013 |
| JP | 2013-517989 A | 5/2013 |
| JP | 2013-517990 A | 5/2013 |
| JP | 2013-124006 A | 6/2013 |
| JP | 5235658 B2 | 7/2013 |
| JP | 5243447 B2 | 7/2013 |
| JP | 2013-230716 A | 11/2013 |
| JP | 2013-230717 A | 11/2013 |
| JP | 2013-230723 A | 11/2013 |
| JP | 5479732 B2 | 4/2014 |
| JP | 2014-076707 A | 5/2014 |
| JP | 2014-091342 A | 5/2014 |
| JP | 2014-101055 A | 6/2014 |
| JP | 2014-104790 A | 6/2014 |
| JP | 2014-159243 A | 9/2014 |
| KR | 2008-0034314 A | 4/2008 |
| WO | WO 1987/003846 A1 | 7/1987 |
| WO | WO 1994/022779 A2 | 10/1994 |
| WO | WO 1998/047703 A1 | 10/1998 |
| WO | WO 1999/003678 A1 | 1/1999 |
| WO | WO 1999/065678 A1 | 12/1999 |
| WO | WO 2000/037374 A1 | 6/2000 |
| WO | WO 2000/057243 A1 | 9/2000 |
| WO | WO 2000/067530 A1 | 11/2000 |
| WO | WO 2001/026924 A1 | 4/2001 |
| WO | WO 2002/002472 A1 | 1/2002 |
| WO | WO 2002/072330 A1 | 9/2002 |
| WO | WO 2003/010105 A1 | 2/2003 |
| WO | WO 2003/026869 A1 | 4/2003 |
| WO | WO 2006/030165 A1 | 3/2006 |
| WO | WO 2006/091959 A2 | 8/2006 |
| WO | WO 2006/095005 A1 | 9/2006 |
| WO | WO 2006/135832 A2 | 12/2006 |
| WO | WO 2007/003849 A2 | 1/2007 |
| WO | WO 2007/003849 A3 | 1/2007 |
| WO | WO 2007/119019 A1 | 10/2007 |
| WO | WO 2008/104728 A2 | 9/2008 |
| WO | WO 2008/132397 A2 | 11/2008 |
| WO | WO 2009/074266 A1 | 6/2009 |
| WO | WO 2010/034944 A1 | 4/2010 |
| WO | WO 2010/034945 A1 | 4/2010 |
| WO | WO 2010/034949 A1 | 4/2010 |
| WO | WO 2010/034950 A1 | 4/2010 |
| WO | WO 2010/049638 A1 | 5/2010 |
| WO | WO 2009/056775 A2 | 8/2010 |
| WO | WO 2011/092419 A1 | 4/2011 |
| WO | WO 2011/092420 A2 | 4/2011 |
| WO | WO 2011/092421 A1 | 4/2011 |
| WO | WO 2011/054826 A1 | 5/2011 |
| WO | WO 2011/067541 A1 | 6/2011 |
| WO | WO 2011/157911 A1 | 12/2011 |
| WO | WO 2012/055873 A2 | 5/2012 |
| WO | WO 2012/055873 A3 | 5/2012 |
| WO | WO 2012/080621 A1 | 6/2012 |
| WO | WO 2012/085433 A1 | 6/2012 |
| WO | WO 2012/098330 A1 | 7/2012 |
| WO | WO 2012/104530 A1 | 8/2012 |
| WO | WO 2012/126708 A1 | 9/2012 |
| WO | WO 2012/168009 A1 | 12/2012 |
| WO | WO 2012/168628 A1 | 12/2012 |
| WO | WO 2012/168646 A1 | 12/2012 |
| WO | WO 2013/017790 A1 | 2/2013 |
| WO | WO 2013/017791 A1 | 2/2013 |
| WO | WO 2013/017792 A1 | 2/2013 |
| WO | WO 2013/054059 A1 | 4/2013 |
| WO | WO 2013/068678 A1 | 5/2013 |
| WO | WO 2013/068679 A1 | 5/2013 |
| WO | WO 2013/079832 A1 | 6/2013 |
| WO | WO 2013/087518 A1 | 6/2013 |
| WO | WO 2013/093301 A1 | 6/2013 |
| WO | WO 2013/110885 A1 | 8/2013 |
| WO | WO 2013/121134 A1 | 8/2013 |
| WO | WO 2013/153303 A1 | 10/2013 |
| WO | WO 2013/167832 A1 | 11/2013 |
| WO | WO 2014/009630 A1 | 1/2014 |
| WO | WO 2014/020249 A1 | 2/2014 |
| WO | WO 2014/037643 A1 | 3/2014 |
| WO | WO 2014/037671 A1 | 3/2014 |
| WO | WO 2014/057200 A1 | 4/2014 |
| WO | WO 2014/060338 A1 | 4/2014 |
| WO | WO 2015/052655 A1 | 4/2015 |
| WO | WO 2015/079186 A1 | 6/2015 |

OTHER PUBLICATIONS

U.S. Appl. No. 61/887,687, filed Oct. 7, 2013.
International Patent Application No. PCT/EP2011/068667; Int'l Search Report; dated Jun. 1, 2012; 5 pages.
International Patent Application No. PCT/EP2011/068667; Int'l Preliminary Report on Patentability; dated Apr. 30, 2013; 12 pages.
International Patent Application No. PCT/DE2005/002068; Int'l Preliminary Report on Patentability; dated May 22, 2007; 5 pages.
Bauer D.R.; "Application of Failure Models for Predicting Weatherability in Automotive Coatings"; American Chemical Society; Chapter 24; 1999; p. 378-395.
Anand et al.; "Role of adhesives in the dimensional stability of polycarbonate structural panels"; Int'l Journal of Adhesion & Adhesives; vol. 27; 2007; p. 338-350.
International Patent Application No. PCT/IB2016/055338; Int'l Search Report and the Written Opinion; dated Nov. 25, 2016; 15 pages.
International Patent Application No. PCT/IB2016/055338; Int'l Preliminary Report on Patentability; dated Mar. 22, 2018; 10 pages.
International Patent Application No. PCT/IB2016/055334; Int'l Written Opinion and the Search Report; dated Nov. 22, 2016; 10 pages.
International Patent Application No. PCT/IB2016/055334; Int'l Preliminary Report on Patentability; dated Mar. 22, 2018; 7 pages.
International Patent Application No. PCT/IB2016/055333; Int'l Written Opinion and the Search Report; dated Jan. 2, 2017; 11 pages.
International Patent Application No. PCT/IB2016/055333; Int'l Preliminary Report on Patentability; dated Mar. 22, 2018; 7 pages.
International Patent Application No. PCT/IB2016/055332; Int'l Search Report and the Written Opinion; dated Jan. 2, 2017; 12 pages.
International Patent Application No. PCT/IB2016/055332; Int'l Preliminary Report on Patentability; dated Mar. 22, 2018; 8 pages.

* cited by examiner

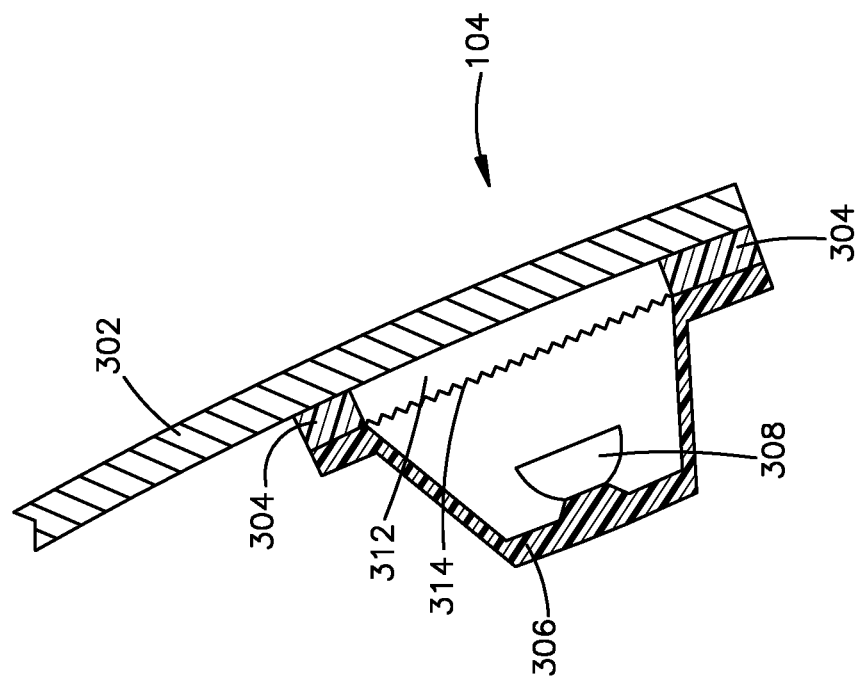
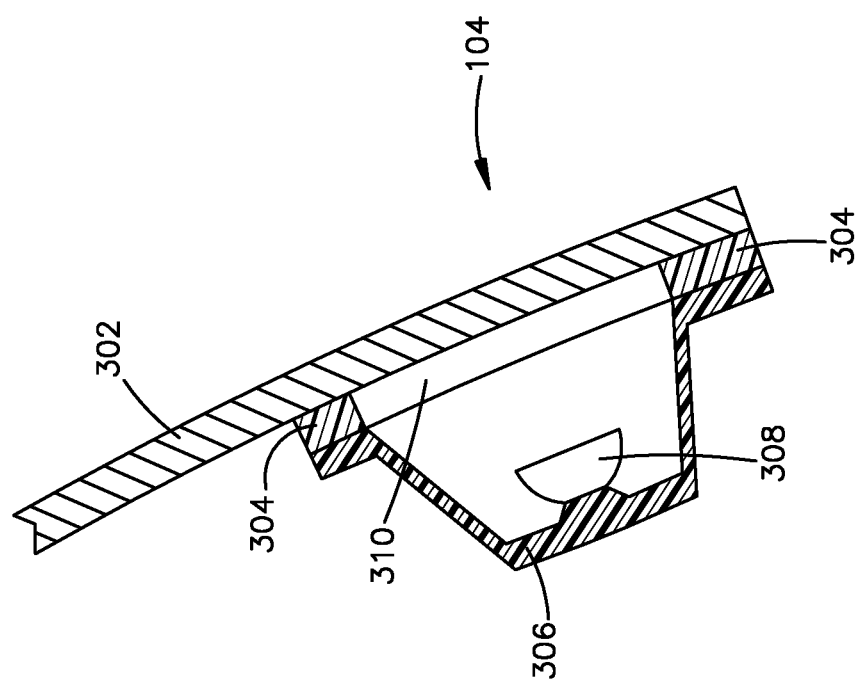

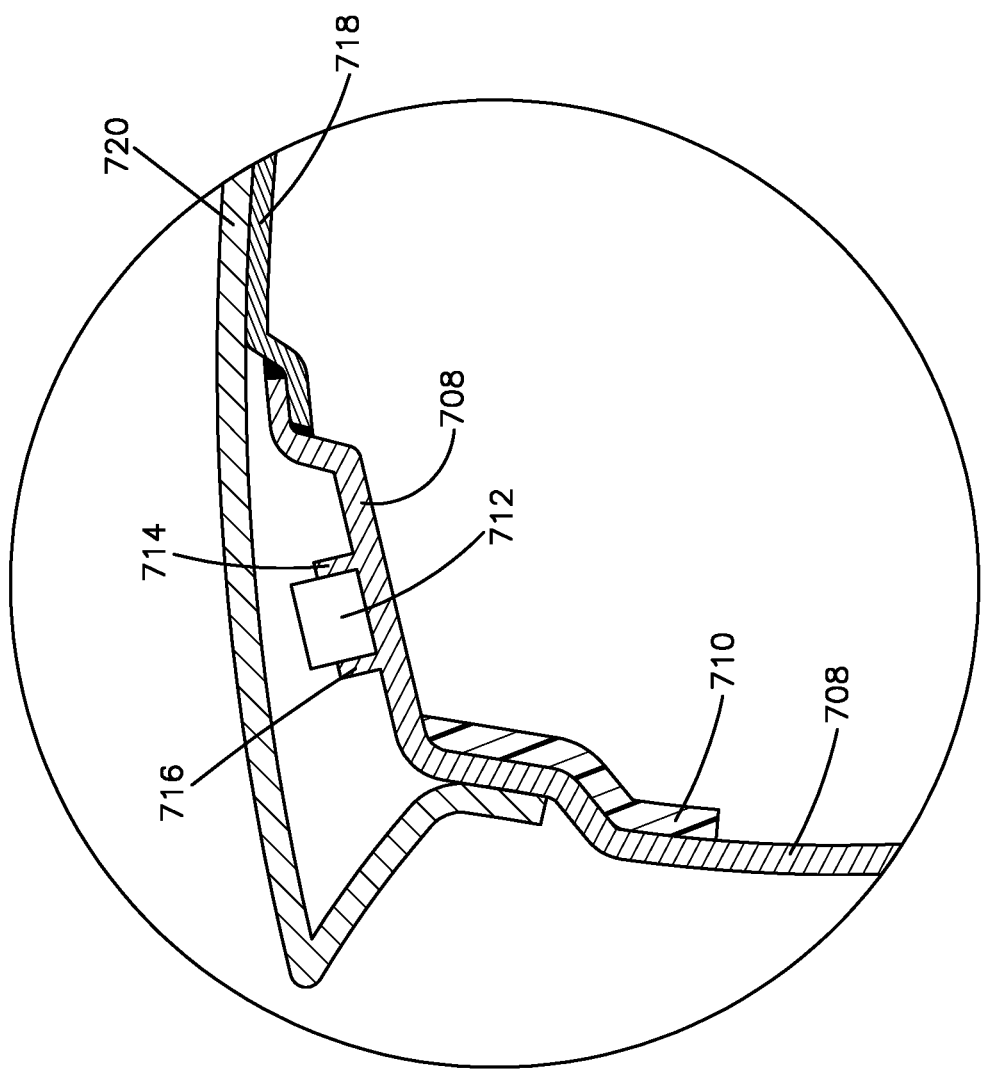

LIGHTING SYSTEMS OF TAILGATES WITH PLASTIC GLAZING

CROSS-REFERENCE TO RELATED APPLICATIONS

This application is a Continuation of U.S. application Ser. No. 15/756,613, filed Mar. 1, 2018, which issued as U.S. Pat. No. 10,690,314 on Jun. 23, 2020, which is the National Stage entry of International Application No. PCT/IB2016/055338 filed Sep. 7, 2016, which claims the benefit of U.S. Provisional Application No. 62/215,082 filed Sep. 7, 2015, the disclosures of which are incorporated herein by this reference in their entireties.

BACKGROUND

Technical Field

The present disclosure relates to tailgates and, specifically, to lighting systems of tailgates of a vehicle having plastic glazing.

Technical Background

Vehicles such as sports utility vehicles ("SUVs"), vans, hatchbacks, and the like include a structural component known as a tailgate. The tailgate is provided to open or close an opening formed at a rear portion of a vehicle. The tailgate is typically hinged to the main vehicle body, for example, along its upper end, such that it can swing open and close. Examples of tailgates include a rear door tailgate or a truck lid tailgate.

The tailgate may support one or more other vehicle components, such as a rear window and one or more light assemblies (e.g., a supplemental brake light, a puddle light). The tailgate may also be adjacent to body cavities into which rear lamp units are inserted. These parts and other parts may add to the cost and complexity of assembling a vehicle.

Light assemblies in vehicles, in particular, comprise a large number of separate components. For example, a typical vehicle may have several different types of lights, including, for example, parking lights, turn indicator lights, brake lights, and the like. Each of these lights may be made from many parts. These parts add to the cost and complexity of assembling a vehicle. Accordingly, as recognized in U.S. Pat. No. 7,048,423 ("the '423 Patent"), it desirable to have a lighting assembly with fewer parts. The '423 Patent discloses an integrated light assembly including a plurality of lamps 210, 216 enclosed in a housing 202, which may serve as a lens for the lamps, and mounted on a substrate 204. Because the lamps 210, 216 share a common substrate and lens, the additional cost of having a separate lamp unit is eliminated. This structure disclosed in the '423 Patent, however, has many drawbacks. For one, because multiple lamps are mounted together in a single housing without sidewalls or reflectors for directing the angle of their light, the structure does not account for haziness issues. Moreover, if two lights of varying color are mounted in the housing, the structure disclosed in the '423 Patent does not have a way of preventing color overlap. These drawbacks may limit the use of such a light assembly in a vehicle under state and federal regulations governing vehicle lighting requirements. Thus, while the '423 Patent discloses an integrated part for a vehicle, its application may be limited.

Moreover, conventional light assemblies in vehicles, including the one described in the '423 Patent, remain separate from other vehicle components. In particular, a light assembly may have a lens portion and a housing portion that are separate from the remaining components of a vehicle. Thus, while a light assembly may be placed behind a translucent component of a vehicle, such as, for example, a glass exterior, the light assembly may have a separate lens for transmitting a light to an exterior of the vehicle. And while a light assembly may be supported in place in a vehicle by another vehicle component, the light assembly may have a separate housing unit for supporting its light source. Such portions of a light assembly may add to the overall weight of a vehicle, and the overall complexity and cost of manufacturing and assembling a vehicle.

Inhomogeneities such as seams and openings between separate vehicle components may also add to the cost of assembling, sealing and/or insulating an interior of the vehicle and/or its components. Moreover such seams and openings may cause aerodynamic inefficiencies and disturb the vehicle's overall aesthetical appearance. Additional components may also be required to connect separate vehicle components to one another, which may add to the overall weight of a vehicle.

The present disclosure aims to solve these problems and other problems in the prior art.

SUMMARY

In accordance with the purpose(s) of the invention, as embodied and broadly described herein, this disclosure, in one aspect, relates to vehicle components, including tailgates, and to lighting systems of tailgates with plastic glazing.

As will be apparent from the present disclosure, problems and/or objectives for improvement with respect to a tailgate including plastic glazing, as described herein, may include providing a tailgate that integrates one or more other components of a vehicle, thereby reducing a total number of components of a vehicle and reducing the complexity and cost of assembling a vehicle. Such problems and/or objectives for improvement also may include providing a tailgate that reduces a number of inhomogeneities, seams, and other faults along a surface of a vehicle, thereby increasing an aesthetic appearance of the vehicle and increasing aerodynamic performance. Such problems and/or objectives for improvement further may include providing a tailgate that conceals one or more other features of a vehicle, such as, for example, a light assembly or unit, thereby increasing an aesthetic appearance of the vehicle.

Problems and/or objectives for improvement with respect to a tailgate, as described herein, may also include providing a tailgate with integrated lighting functions. For example, the present disclosure may provide a tailgate having a plastic glazing that functions as a lens of a molded light assembly. The molded light assembly may be, for example, a tail lamp, a turn signal light, a puddle light, a license plate light, or an interior light. A housing unit connected to the back of the plastic glazing may support and isolate the molded light assemblies from one another, thereby preventing any color overlap between the various light assemblies. The housing unit may also remove the need for a separate housing unit for each molded light assembly. As such, the housing unit and the plastic glazing of the tailgate may reduce a number of components required to assemble the lighting system of a vehicle. The plastic glazing may also be made using an automated, machine-based, injection molding process, further streamlining production and reducing labor costs.

Problems and/or objectives for improvement with respect to a tailgate, as described herein, may also include replacing certain heavier components of a vehicle with plastic components. For example, the present disclosure may provide a tailgate formed entirely of plastic components, whereby a translucent portion of the tailgate that is transparent may serve as a rear window instead of a glass component. The plastic may weigh less than a glass window, and may also have stronger structural qualities.

Problems and/or objectives for improvement with respect to a tailgate, as described herein, may also include incorporating a texture, marking, or the like into a plastic glazing of a tailgate in order to enhance certain lighting features of the tailgate. The texture, marking, etc. may affect the passage of light through the plastic glazing to serve both a functional and aesthetical purpose. For example, the plastic glazing may comprise a texture along a region that serves as a lens of a molded light assembly to disperse light emitted by the molded light assembly to satisfy regulatory requirements and/or produce a certain aesthetical effect.

Accordingly, aspects of the present disclosure provide plastic glazing of a tailgate of a vehicle, the plastic glazing comprising: a first translucent component; a second translucent component molded onto the first translucent component, wherein the second translucent component comprises a color, wherein the plastic glazing is of one-piece molded plastic construction, wherein an overlapping portion of the first translucent component and the second translucent component forms a lens of a first molded light assembly.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The foregoing summary, as well as the following detailed description, is better understood when read in conjunction with the appended drawings. There is shown in the drawings example embodiments, and the present invention is not intended to be limited to the specific embodiments and methods disclosed.

FIG. 3 is a partial cross-sectional view of the first exemplary tailgate glazing depicted in FIG. 1 with a partial cross-sectional view of a housing unit in accordance with an embodiment of the present disclosure.

FIG. 4 is a partial cross-sectional view of the first exemplary tailgate glazing depicted in FIG. 1 with a partial cross-sectional view of a housing unit in accordance with an alternative embodiment of the present disclosure.

FIG. 11 is an enlarged view of the cross-sectional view of the vehicle having the third exemplary plastic glazing depicted in FIG. 9.

DESCRIPTION

Figure 1:
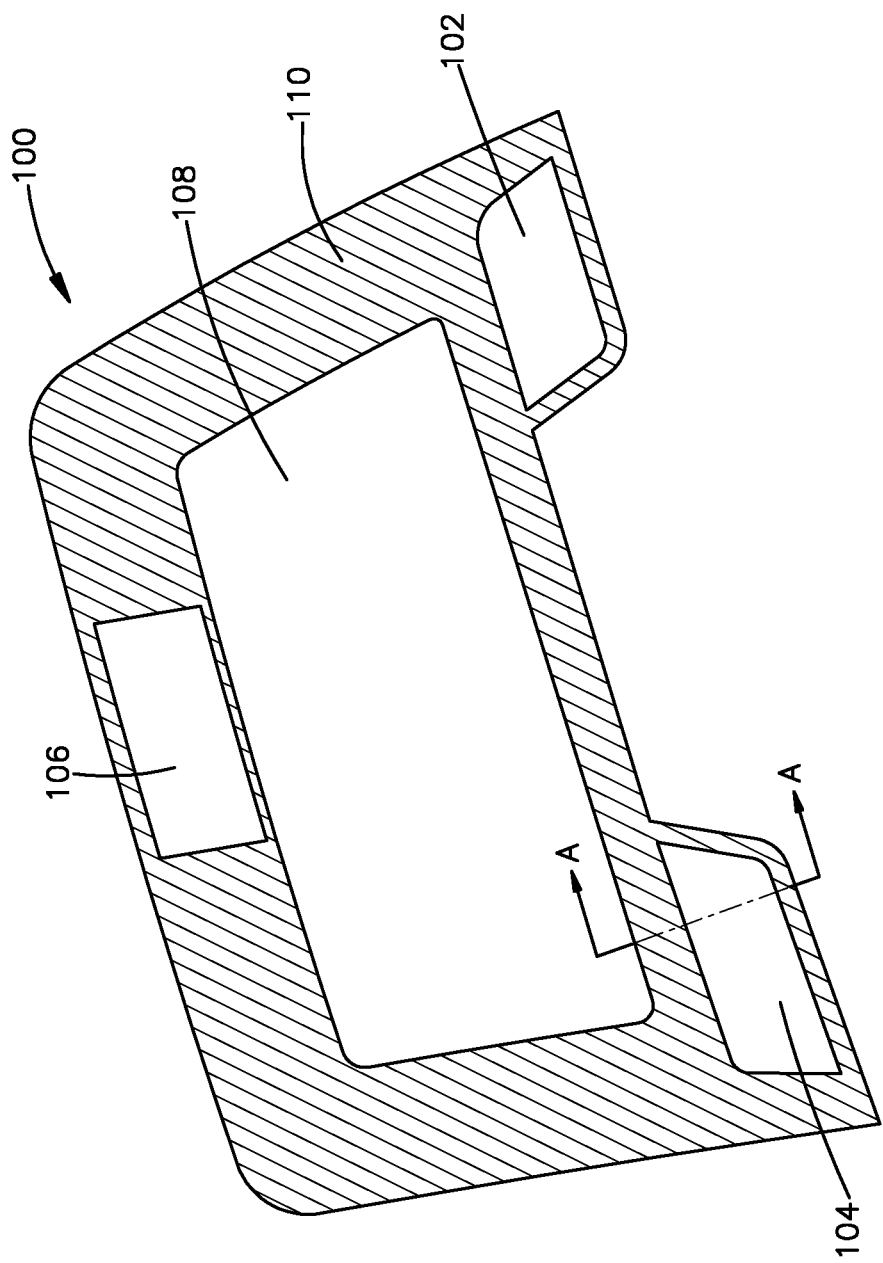
FIG. 1 is a schematic view of a front of a first exemplary plastic glazing of a tailgate in accordance with an embodiment of the present disclosure.

Aspects of the disclosure will now be described in detail with reference to the drawings, wherein like reference numerals designate identical or corresponding parts throughout the several views, unless specified otherwise.

Systems and methods disclosed herein provide a tailgate or lift gate and, in particular, a tailgate having a plastic glazing having a one-piece monolithic construction. The one-piece monolithic structure can be fabricated in one piece using an injection molding process. Vehicles of a hatchback or van configuration typically include an access opening at their rear and a tailgate that selectively opens and closes the access opening. The tailgate may be mounted on the main body of the vehicle using a hinged connection. As such, the tailgate may operate like a hinged flap, which swings open and close along the hinged connection. The tailgate is typically operated manually but may also be operated electronically using a power actuator.

The tailgate may support one or more other vehicle components such as a rear glass window, a logo or marking, a light assembly or unit, a license plate holder, etc. These components are usually attached to the tailgate using screws or other connectors or an adhesive. In its closed position, the tailgate may also be adjacent to one or more cavities in the body of the vehicle for receiving a rear lamp unit or other light unit.

In order to reduce the number of separate components of a vehicle, systems and methods disclosed herein may provide an integrated tailgate assembly including and/or integrating one or more other vehicle components. For example, systems and methods disclosed herein may provide a tailgate having a plastic glazing including a rear window. The plastic glazing of the tailgate may be constructed of a thermoplastic polymer including a portion that is clear as the rear window. In other systems and methods disclosed herein, additional vehicle components may also be included in the plastic glazing. Such components may include, for example, a colored translucent portion for a rear light unit; an additional translucent portion for a courtesy light, a license plate light, or other light unit; a cavity and fixation unit (e.g., a threaded hole, a hook or clip) for supporting a light unit; a cavity and fixation unit for supporting a license plate; a textured and/or raised region for a logo or other marking; a spoiler or other aerodynamic feature; an opening that serves as a ventilation opening; and the like.

In particular, systems and methods disclosed herein may also provide an improvement over existing vehicles having separate light units. Light units in many conventional vehicles are typically self-contained and separate from the other components of the vehicle. Each light unit typically requires its own housing unit and lens. Systems and methods disclosed herein provide an improvement over such existing systems by providing a light unit that is integrated with other components of a vehicle. Specifically, systems and methods disclosed herein may provide a plastic glazing of a tailgate that may function as a lens of a light unit. Systems and methods disclosed herein may also provide a housing structure for a tailgate that may function as the housing unit for multiple different light units. Accordingly, systems and methods disclosed herein eliminate the need for having a separate light unit in a vehicle. Such systems and methods allow a light source to be supported within a housing of a tailgate and to use a plastic glazing of the tailgate as its lens. As such, such systems and methods disclosed herein reduce a number of components of a vehicle's light units, thereby reducing a cost of manufacturing and assembling the vehicle.

Systems and methods disclosed herein may provide a tailgate having an integrated lighting system that conforms to certain federal regulatory requirements and/or international standards for vehicle lighting. For example, certain international standards, such as, for example, ECE Regulation No. 48 and SAE Standard J578, may require specific colors of light be emitted from a lighting device for a vehicle. In systems and methods disclosed herein, a light source (e.g., a LED) may be positioned behind a plastic glazing. The color of the plastic glazing may shift the color of the light from the light source. Accordingly, if light sources from existing lighting systems are used, the color of the light emitted from the plastic glazing into the surrounding environment may no longer be in conformance with certain legal requirements. Systems and methods disclosed herein, however, may use light sources having adjusted colors that compensate for the color shift of the plastic glazing. Alternatively, systems and methods disclosed herein may use components for forming a plastic glazing having colors that enable a transmission of light within the legal color space when used with existing light sources. As such, systems and methods disclosed herein provide a method for accounting for a color shift resulting from the use of a colored plastic glazing, such as, for example, a plastic glazing having a green or brown glazing color. A colored plastic glazing may especially be desirable for privacy tinting purposes.

Systems and methods disclosed herein may also provide a tailgate having interior lighting functions. Many individuals desire having interior lighting in a vehicle for both functional and aesthetical purposes. For example, interior lighting may be used to provide a unique ambience within a vehicle. As another example, lights designed to illuminate an interior of the vehicle may serve certain guiding functions. The inclusion of interior lights oftentimes may add to the expense of manufacturing and assembling a vehicle due to the need for additional lighting components. Systems and methods disclosed herein, however, may provide a method for integrating an interior lighting feature into a plastic glazing of a tailgate of a vehicle. The interior lighting feature may be formed as part of an injection molding process for forming the plastic glazing of the tailgate. Accordingly, such systems and methods may reduce a number of additional components needed for the interior lighting feature. Because the injection molding process may be machine-automated, such systems and methods may also automate the process for forming the interior lighting feature.

Systems and methods disclosed herein may also provide a tailgate having applique lighting. The tailgate may have a plastic glazing that is formed with a plurality of depressions, each for receiving a corresponding lens or cover component of the applique lighting. The dimensions of the depressions in the plastic glazing and the dimensions of the cover components may be designed to have an interference fit between them, such as, for example, a 0.1 mm interference fit. The dimension of the thickness or height of the cover may be configured such that the cover, when placed within the depression, forms a surface that is flush with a surrounding region of the plastic glazing. In a preferred embodiment of the present disclosure, the applique lighting may be in the shape of letters or other graphic designs. The height and width of the letters may vary depending on the desired appearance of the applique lighting.

Systems and methods disclosed herein may also provide a tailgate that reduces a number of inhomogeneities, seams, and other disruptions, interruptions, and gaps along a surface of a vehicle, thereby increasing an aesthetic appearance of the vehicle and increasing aerodynamic performance. Systems and methods disclosed herein further may provide a tailgate that conceals one or more other features of a vehicle, such as, for example, a light unit, thereby increasing an aesthetic appearance of the vehicle.

Systems and methods disclosed herein may also provide a method of manufacturing a tailgate or, specifically, a plastic glazing of a tailgate. Such systems and methods may provide a method of producing a plastic glazing using multi-shot injection molding techniques. For example, in certain aspects of the disclosure, a plastic glazing of a tailgate may be formed via a three-shot injection molding process. In a first shot, a clear thermoplastic polymer may be injected to form a shell or outline of the plastic glazing. In a second shot, a colored thermoplastic polymer may be injected to form one or more colored regions in the plastic glazing. For example, a red thermoplastic polymer may be injected to form a red translucent region to serve as the lens for a rear light of a vehicle.

Referring now to FIG. 1, an exemplary plastic glazing 100 of a tailgate of a vehicle is depicted. The plastic glazing 100 may be a one-piece monolithic structure formed of one or more thermoplastic polymers. Examples of suitable thermoplastic polymers include: polycarbonate, polyester carbonate, poly methyl methacrylate, and the like. According to a preferred aspect of the disclosure, the plastic glazing 100 may be formed of a polycarbonate. The plastic glazing 100 can have an outer surface that is seamless, i.e., lacking any visual openings, junctions, disruptions, interruptions, gaps, or the like.

The plastic glazing 100 has a first colored portion 102 that functions as a portion of a right tail lamp of the vehicle, and a second colored portion 104 that functions as a portion of a left tail lamp of the vehicle. In particular, the colored portions 102, 104 can function as lenses of the tail lamps of the vehicle. The plastic glazing 100 also has a third portion 106 for an additional light unit such as, for example, an axillary brake light or a courtesy light. The plastic glazing 100 also includes a clear transparent portion 108 that functions as a rear window of the vehicle, and a colored non-transparent portion 110. The colored non-transparent portion may be strategically placed to hide one or more structures positioned behind the plastic glazing 100.

Figure 2:
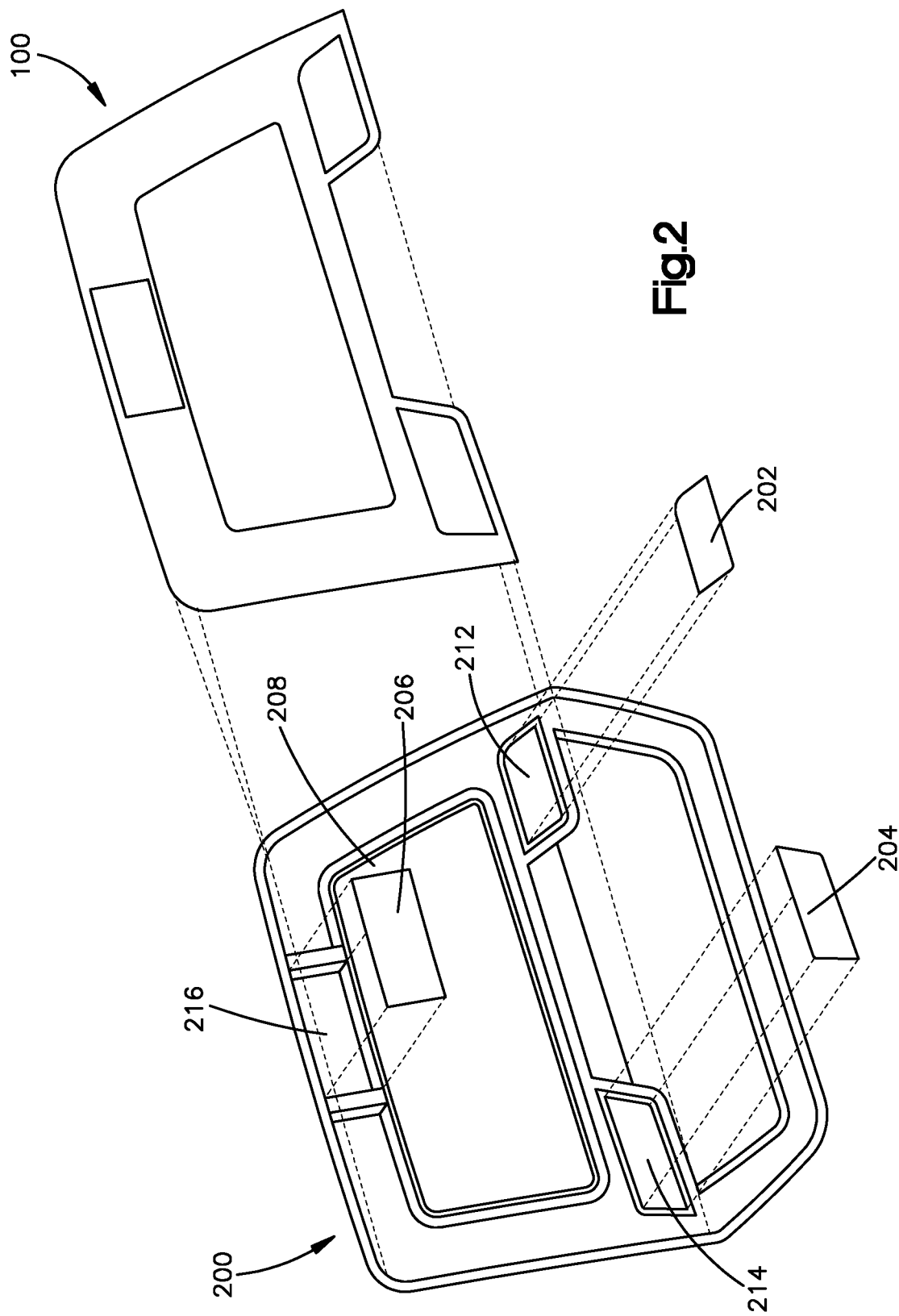
FIG. 2 is a deconstructed view of a tailgate assembly including the first exemplary plastic glazing depicted in FIG. 1 and a housing unit in accordance with an embodiment of the present disclosure.

Referring now to FIG. 2, a housing unit 200 of a tailgate is depicted. The housing unit 200 may be formed of a fiber-reinforced polymer. According to a preferred aspect of the disclosure, the housing unit 200 may be formed of a long-glass fiber-reinforced polypropylene such as, for example, SABIC® STAMAX™ plastic. As depicted in FIG. 2, the housing unit 200 comprises one or more cavities for receiving a light unit. In particular, the housing unit 200 comprises a first cavity 212 for receiving a first light unit 202, a second cavity 214 for receiving a second light unit 204, and a third cavity 216 for receiving a third light unit 206. The light units 202, 204, 206 can be fixed directly onto the housing unit 200 via access doors and/or using mechanical fasteners (e.g., screw, bolt, and the like). The cavities 212, 214, 216 can prevent light from the light units from bleeding outside of a confined space. As such, additional cavities (not depicted) may be formed next to the cavities 212, 214, 216 for holding additional light units, and the cavities would prevent the light generated by one light unit from bleeding into a space reserved for another light unit.

The light units 202, 204, 206 may be a single type of light unit. For example, the light units 202, 204, 206 can be brake light units. Alternatively, the light units 202, 204, 206 may comprise more than one kind of light unit. For example, the light units 202, 204 can be brake light units, and the light unit 206 can be a courtesy light unit.

The plastic glazing 100 may be secured to the housing unit 200 such that the light units 202, 204, 206 are disposed between the plastic glazing 100 and the housing unit 200. In particular, the plastic glazing 100 may be secured to the housing unit 200 such that the light units 202, 204, 206 are disposed behind the portions 102, 104, 106 (depicted in FIG. 1). The light unit 202 may be disposed behind the first colored portion 102, the light unit 204 may be disposed behind the second colored portion 104, and the light unit 206 may be disposed behind the third portion 106.

Each of the light units 202, 204, 206 may comprise a light source that generates a white or a colored light. The light generated by the light units 202, 204, 206 may pass through the portions 102, 104, 106, respectively.

Light emitted from the light units 202, 204, 206 through the portions 102, 104, 106 of the plastic glazing 100 may be emitted as a colored light in accordance with certain international standards governing vehicle lighting such as, for example, ECE Regulation No. 48 and SAE Standard J578. As noted above, the portions 102, 104 can function as the lens for the vehicle's tail lamps. Accordingly, light emitted from the light units 202, 204 through the portions 102, 104 may be red. ECE Regulation No. 48 defines the color "red" as emitted light with chromaticity coordinates (x,y) that lie within the chromaticity areas defined by the following boundaries in the CIE xyY color space:

$R_{12}$ yellow boundary: y=0.335
$R_{23}$ the spectral locus
$R_{34}$ the purple line
$R_{41}$ purple boundary: y=0.980−x With the following (x,y) intersection points:

$R_1$: (0.645, 0.335)
$R_2$: (0.665, 0.335)
$R_3$: (0.735, 0.265)
$R_4$: (0.721, 0.259)

Thus, to fulfill this regulation, the light emitted through the portions 102, 104 may have chromaticity coordinates (x,y) that fall within the chromaticity area defined for the color red in ECE Regulation No. 48, as set forth above.

While the portions 102, 104 and the light units 202, 204 are described herein as producing a red light, one of ordinary skill in the art would appreciate that the portions 102, 104 and the light units 202, 204 may also be designed to produce lights having other colors, such as, for example, yellow or amber. These colors are also defined in ECE Regulation No. 48 as well as in other international standards.

The housing unit 200 also includes an opening 208. When the plastic glazing 100 is secured to the housing unit 200 such that the light units 202, 204, 206 line up with the portions 102, 104, 106, the opening 208 may line up with the clear transparent portion 108 of the plastic glazing 100. By lining up with the clear transparent portion 108, the opening 208 allows an individual's view through the transparent portion 108 (which, as described above, may function as the rear window of the vehicle) to remain unobstructed.

Each of the light units 202, 204, 206 may include one or more light components such as, for example, an incandescent lamp, an electroluminescent lamp, a gas discharge lamp, and the like. Because the light units 202, 204, 206 are secured directly onto the housing unit 200, a separate housing for each light unit 202, 204, 206 may not be needed. Thus, the housing unit 200, which serves as the structural carrier for the plastic glazing 100 of the tailgate, integrates a housing function of a light unit. Moreover, because the portions 102, 104, 106 may function as the lens of a light unit—i.e., the portion 102 may function as the lens for the light unit 202, the portion 104 may function as the lens for the light unit 204, and the portion 106 may function as the lens for the light unit 206—a separate lens for each light units 202, 204, 206 also may not be needed.

The plastic glazing 100 may be secured to the housing unit 200 using an adhesive and/or a mechanical fastening system (e.g., a screw bolt or clip fastening system). The adhesive used may be a commercially available adhesive that is typically used in the automotive industry for the adhesive bonding of plastic components. Such adhesives may include, for example, wet adhesives, contact adhesives, hot-melt adhesives, or reaction adhesives. The thickness of the adhesive required may vary depending on the specific geometries of the plastic glazing 100 and the housing unit 200. When the adhesive is a hot-melt adhesive that can be processed under thermoplastic conditions, it may be possible to bond the plastic glazing 100, the housing unit 200, and the hot-melt adhesive together during a multi-shot injection molding process.

While the tailgate including the plastic glazing 100 and the housing unit 200 is depicted as having three light units 202, 204, 206, one of ordinary skill in the art would appreciate that the tailgate can comprise less or more light units. Such light units may include, for example, license plate lamps, turn signal lamps, backup lamps, and the like.

FIGS. 3 and 4 present alternative embodiments of a partial cross-sectional view of the plastic glazing 100 depicted in FIG. 1 with a portion of a housing unit (e.g., the housing unit 200) disposed behind the plastic glazing 100. In FIG. 3, a first embodiment is shown where the plastic glazing 100 is formed of a first component 302, a second component 304, and a third component 310. The first component 302, the second component 304, and the third component 310 may be formed of thermoplastic polymers, such as, for example, polycarbonate resins. The first component 302 and the second component 304 may be translucent, and the third component 310 may be non-transparent. An overlapping portion of the first component 302 and the second component 304 may form the colored portion 104.

A light source 308 of the light unit 204 may be disposed behind the colored portion 104. The light source 308 may emit light beams that travel through the colored portion 104 to an exterior of the vehicle. The light source 308 may be supported by a portion 306 of the housing unit 200. The portion 306 may form the cavity 214 for receiving the light unit 204. The light source 308 may be mounted to the housing unit 200 using a fixation mechanism (e.g., a screw system, an adhesive, and the like).

When the light beams emitted by the light source 308 travel through the overlapping portion of the first component 302 and the second component 304 (i.e., the colored portion 104), their color, intensity, and direction of travel can be altered depending on the properties of the first component 302 and the second component 304. Relevant properties may include, for example, the colors of the first component 302 and the second component 304, the thicknesses of the first component 302 and the second component 304, the internal molecular structure of the first component 302 and the second component 304, etc. As such, these properties can be adjusted to achieve a certain desired color of emitted light, at a certain dispersion level and at a certain intensity.

As described above, certain international standards such as ECE Regulation No. 48 and SAE Standard J578 may define certain color requirements for particular types of vehicle lights. For example, the U.S. Department of Transportation requires that vehicle tail lamps emit a red colored light in accordance with SAE Standard J578. SAE Standard J578 defines a red light as a light having a chromaticity value that falls within the color space defined by yellow boundary corresponding to y=0.33 and a purple boundary corresponding to y=0.98−x. ECE Regulation No. 48 sets forth the same standard. The U.S. Department of Transportation also requires that turn signal lights on vehicles emit a red or amber colored light. SAE Standard J578 defines an amber light as a light having a chromaticity value that falls within the color space defined by a red boundary corresponding to y=0.39, a white boundary corresponding to y=0.79−0.67x, and a green boundary corresponding to y=x−0.12.

In a preferred aspect of the disclosure, the colors of the first component 302 and the second component 304 may be selected, taking into account the color of the light emitted by the light source 308, such that the color of the light emitted through the plastic glazing 100 may fall within the color space defined required by federal regulations, as defined by the SAE Standard J578 or another international standard. If the light source 308 emits a white light, then the colors of the first component 302 and the second component 304 may be selected such that they impart a red color to the white light as it passes through the first component 302 and the second component 304. If the light source 308 emits a colored light, then different colors for the first component 302 and the second component 304 may be selected such that the color of the colored light shifts accordingly to meet regulatory requirements when it passes through the first component 302 and the second component 304.

The colors of the first component 302 and the second component 304 may also be adjusted to account for their individual colors. For example, the first component 302 may form a rear window of the vehicle. Thus, it may be desirable to have the first component 302 have a green or brown tint. Such may undesirably shift the color of any light that passes through the first component 302 away from the red or amber color required by federal regulations. Accordingly, in an effort to avoid falling out of the legal color space, the color of the second component 304 can be selected such that it accounts for the undesirable color shift that the first component 302 will produce.

While FIGS. 3 and 4 depicts a light source 308 that is disposed behind an overlapping portion of two translucent components (e.g., the first component 302 and the second component 304), one of ordinary skill in the art would appreciate that a single translucent component may operate with the light source 308 to generate a light in accordance with international lighting standards and federal regulations. In certain aspects, the light source 308 may also generate a colored light. Thus, the color of the translucent component through which the generated light travels also can be selected to account for the color of the light generated by the light source 308 such that the light that emerges from the translucent component is in accordance with international lighting standards and federal regulations. In other words, the combination of the color of the light source 308 and the color of the translucent component can be selected such that they produce together a light that is in accordance with international lighting standards and federal regulations. In certain aspects, an additional component (e.g., a separate lens structure) may be placed behind the translucent component of the plastic glazing to further adjust the color and dispersion characteristics of the light that is generated by the light source 308. This additional component may be supported by a housing unit of the tailgate that is disposed behind the translucent component.

The third component 310 may be a non-transparent so that it forms a region of blackout (e.g., opaque or substantially opaque) adjacent to the overlapping portion of the first component 302 and the second component 304 (i.e., the colored portion 104). The third component 310 may be black or be another color and/or effect. This region of blackout may be configured to conceal the sections of the portion 306 of the housing unit 200 that are attached to the plastic glazing 100, and any adhesive or other fixation mechanism used to attach the housing unit 200 to the plastic glazing 100.

Referring now to FIG. 4, a second embodiment of the partial cross-sectional view of the plastic glazing 100 depicted in FIG. 1 with the portion 306 of the housing unit is depicted. In this second embodiment, the second component 304 may be replaced with a fourth component 312 having a textured surface 314. The textured surface 314 may be configured to affect a dispersion of light beams that travel through the fourth component 312. Similar to the second component 304 depicted in FIG. 3, the fourth component 312 may be disposed behind the first component 302, and an overlapping region of the first component 302 and the fourth component 312 may form a lens for the light unit 204 (depicted in FIG. 2). Light that is emitted by the light source 308 of the light unit 204 may travel through the overlapping region of the first component 302 and the fourth component 312. Thus, the textured surface of the fourth component 312 may be used to affect the dispersion of light travelling through the overlapping region of the first component 302 and the fourth component 312. In certain aspects of the disclosure, the textured surface of the fourth component 312 may be configured such that it creates an aesthetical pattern in the light that is emitted from the overlapping region of the first component 302 and the fourth component 312 (i.e., the colored portion 104). In other aspects of the disclosure, the textured surface of the fourth component 312 may be configured such that it controls the dispersion of light through the colored portion 104 to conform to certain regulatory requirements. As such, the textured surface of the fourth component 312 may be configured to achieve either an aesthetical or functional effect.

Figure 5:
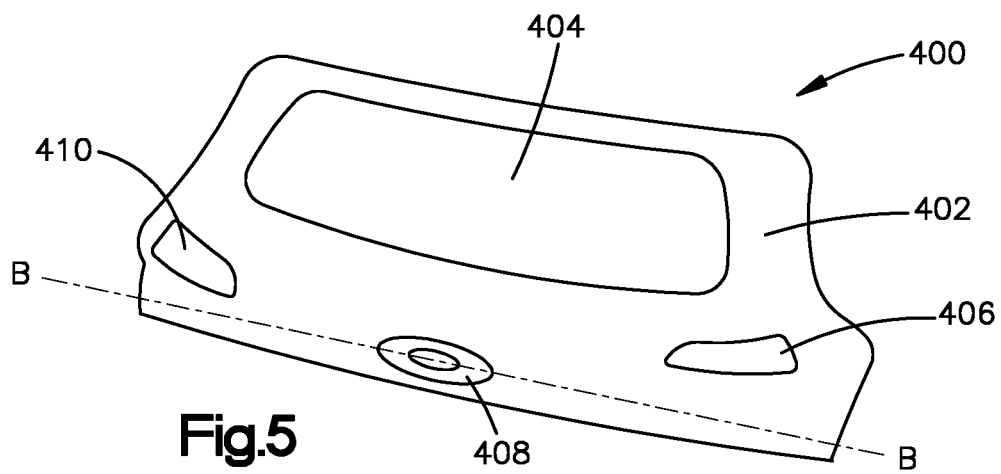
FIG. 5 is a schematic view of a front of a second exemplary plastic glazing of a tailgate having a logo or marking in accordance with an embodiment of the present disclosure.

Referring now to FIG. 5, an exemplary plastic glazing 400 of a tailgate of a vehicle is depicted. The plastic glazing 400 may be of one-piece monolithic molded plastic construction, and may have an outer surface that is substantially free of any inhomogeneities, seams, and other disruptions, interruptions, and gaps. The plastic glazing 400 may comprise a portion 406 that functions as a lens of a first light unit, a portion 410 that functions as a lens of a second light unit, and a portion 404 that functions as a rear window of the vehicle. The plastic glazing 400 may also comprise a non-transparent portion 402, which can conceal one or more other vehicle components.

Additionally, the plastic glazing 400 may comprise a logo or marking 408. The logo 408 may be raised from a region of the plastic glazing 400 that surround it. The logo 408 may be an example of a raised marking. Further details of the logo 408 are described with reference to FIG. 8 below.

Figure 6:
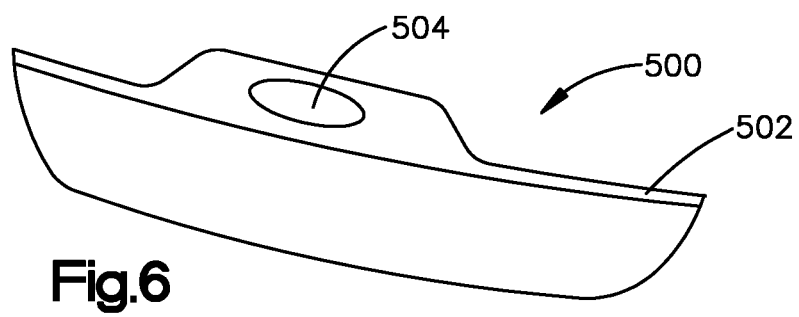
FIG. 6 is a schematic view of an outer panel of a vehicle configured to fit together with the second exemplary plastic glazing depicted in FIG. 5 in accordance with an embodiment of the present disclosure.
Figure 7:
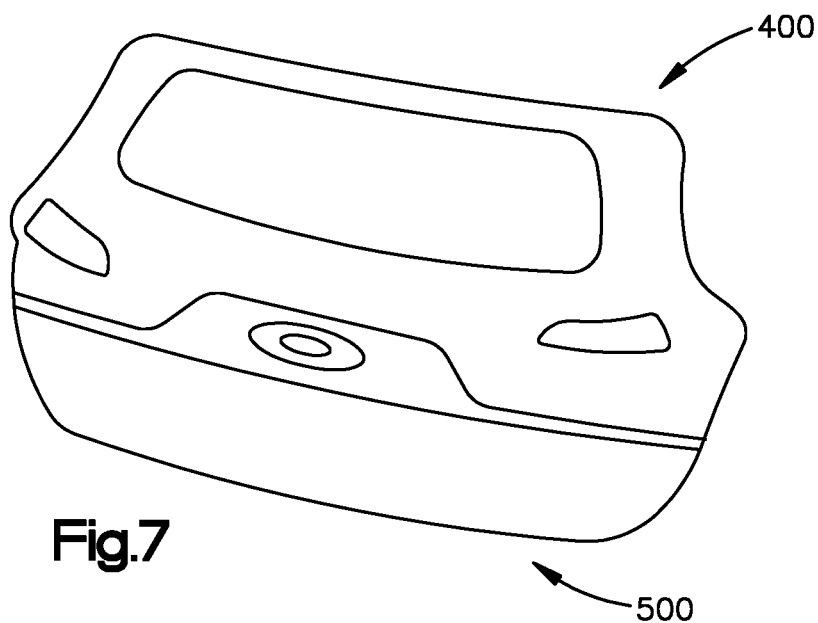
FIG. 7 is a schematic view the second exemplary plastic glazing depicted in FIG. 5 assembled with the outer panel depicted in FIG. 6 in accordance with an embodiment of the present disclosure.

FIG. 6 depicts an outer panel 500 of the vehicle which is designed to attach to the plastic glazing 400. The outer panel of the vehicle may include a main body 502 and an opening 504 through which the logo 408 may fit, as depicted in FIG. 7.

Figure 8:
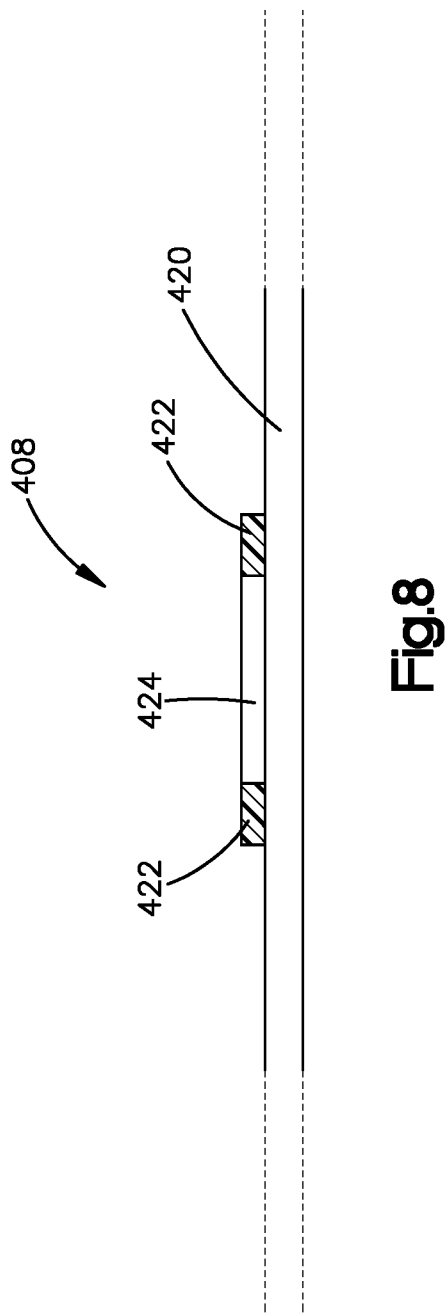
FIG. 8 is a partial cross-sectional view of the second exemplary plastic glazing depicted in FIG. 5.

FIG. 8 depicts a partial cross-sectional view of the plastic glazing 400 along a line B-B, which passes through the logo 408. As depicted in FIG. 8, the logo 408 may be formed of two components, a first component 424 and a second component 422 surrounding the first component 424. The first component 424 and the second component 422 can be selected to be clear or colored, and transparent, translucent, or non-transparent. In a preferred aspect of the disclosure, at least one of the first component 424 and the second component 422 is translucent such that a light disposed behind the plastic glazing towards an interior of the vehicle may shine through the translucent component to increase the visibility of the logo 408, especially when it is dark. The first component 424 and the second component 422 of the logo 408 may be raised from a component 420 which forms a main body of the plastic glazing, including the non-transparent portion 402. The logo 408 can be raised from the rest of the plastic glazing 400 so that it can fit through the opening 504 of the outer panel 500.

The first component 424 and the second component 422 may be formed of a thermoplastic polymer. The first component 424 and the second component 422 may be formed as part of an injection molding process for forming the plastic glazing 400. In a first shot, a first material may be injected into a mold cavity having a first volume to form the component 420. Then, in later shots, the first component 424 and the second component 422 of the logo 408 may be molded onto the component 420. The first component 424 and the second component 422 may bind to the component 420 through melt bonding. To enable optimal bonding between the separate components, the first component 424 and the second component 422 of the logo 408 as well as the component 420 may be formed of a similar thermoplastic polymer, e.g., different colors of polycarbonate resin.

While the logo 408 is depicted as having a first component 424 and a second component 422 in FIG. 8, one or ordinary skill in the art would appreciate that raised markings with more or less components may be used. In certain aspects, a plastic glazing may have a logo that is formed as part of the same component as the main body of the plastic glazing. In such an aspect, the logo may be formed when the component forming the main body is molded using an injection molding technique.

Figure 9:
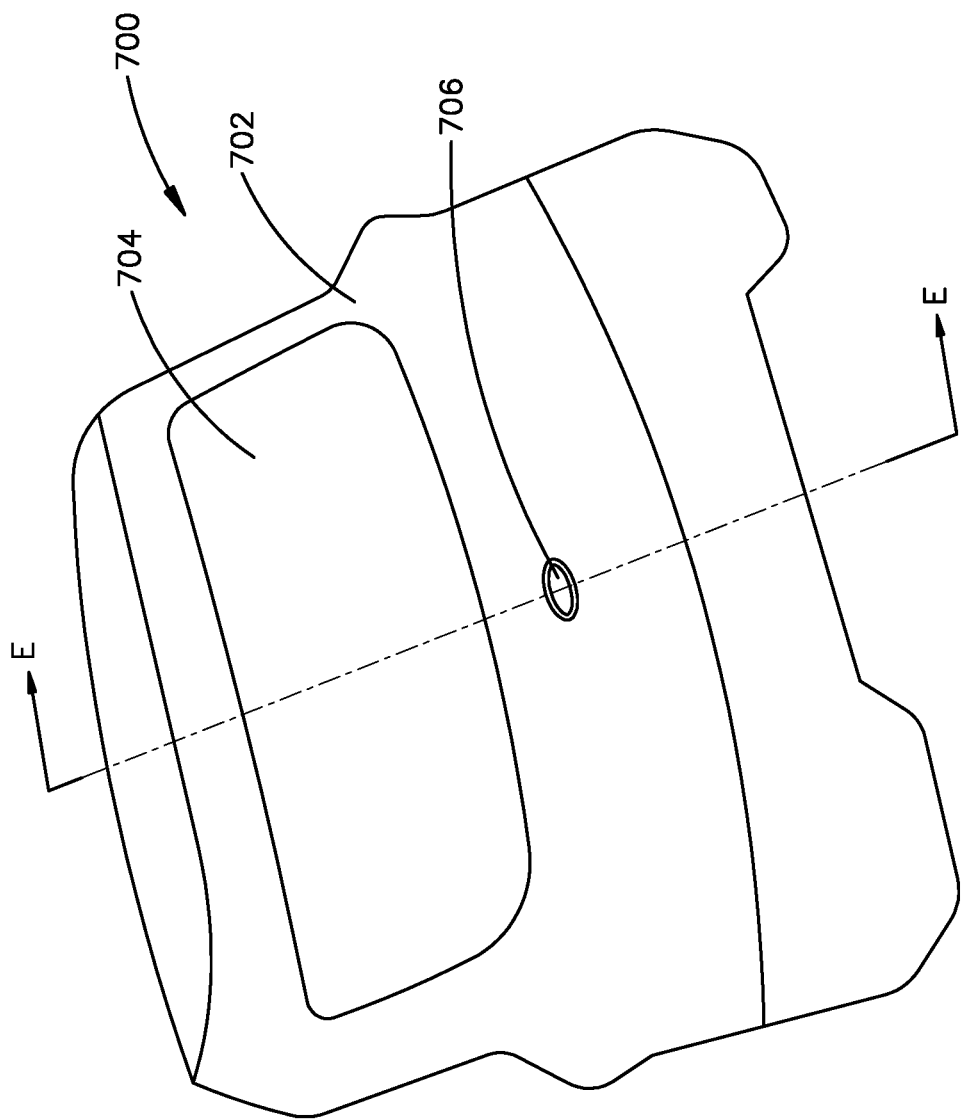
FIG. 9 is a schematic view of a front of a third exemplary plastic glazing of a tailgate having applique lighting in accordance with an embodiment of the present disclosure.

Referring now to FIG. 9, an exemplary plastic glazing 700 of a tailgate of a vehicle is depicted. The plastic glazing 700 may also be of one-piece monolithic molded plastic construction, and may have an outer surface that is substantially free of any inhomogeneities, seams, and other faults. The plastic glazing 700 may comprise a main body 702. The main body 702 may have a first translucent portion 704 that is transparent that functions as a rear window of the vehicle. The main body 702 may also have a second translucent portion 706 that functions as a lens of a light unit 726 (depicted in FIG. 10).

Because the plastic glazing 700 does not include any seams or breaks along its different components, the light unit 726 behind the second translucent portion 706 may be concealed from the outside until the light unit 726 is turned on.

Figure 10:
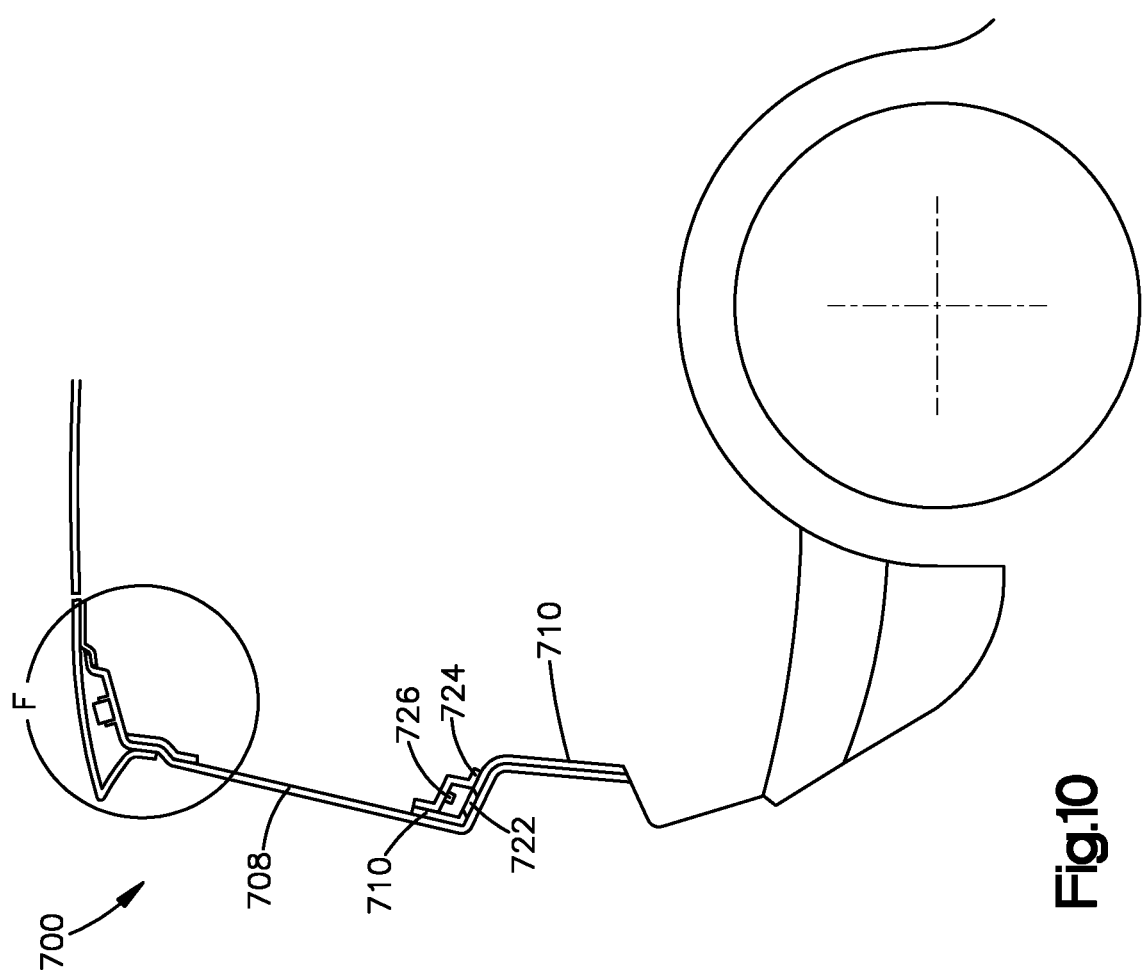
FIG. 10 is a cross sectional view of a vehicle having the third exemplary plastic glazing depicted in FIG. 9.

FIG. 10 depicts a cross-section of the plastic glazing 700 along the line E-E. As depicted in FIG. 10, the light unit 726 can be supported in position by a portion of a housing unit 724. The housing unit 724 may be a portion of an overall housing unit of the tailgate, such as, for example, the housing unit 200 depicted in FIG. 2. The housing unit 724 may be attached to the plastic glazing 700 using an adhesive or other fixation mechanism. The plastic glazing 700 may be formed of a plurality of different components that are molded to one another. The plurality of different components may include a first component 708, a second component 722, and a third component 710. The first component 708 can form a first layer of the plastic glazing 700. The second component 722 and the third component 710 can be disposed on certain regions of the first component 708. The second component 722 can comprise a transparent thermoplastic polymer. An overlapping portion of the first component 708 and the second component 722 may correspond to the first translucent portion 704 depicted in FIG. 9. The third component 710 may comprise a non-transparent thermoplastic polymer. As such, the third component 710 can be used to conceal one or more other vehicle components disposed behind the third component 710.

As depicted in FIG. 10, the portion of the housing unit 724 supporting the light unit 726 may attach to the third component 710 of the plastic glazing 700. In a preferred aspect of the disclosure where the third component 710 comprises a non-transparent polymer, the third component 710 may conceal those portions of the housing unit 724 that attached to the plastic glazing 700 along sections where the third component 710 is disposed. The third component 710 may be specifically disposed at those sections of the plastic tailgate 700 where the housing unit 724 attaches to the plastic glazing 700.

Referring now to FIG. 11, an enlarged view of an upper region labeled F of the cross-sectional view of the plastic glazing 700 is depicted. As shown in the enlarged view, the first component 708 of the plastic glazing 700 may further comprise two fixation mechanisms 714, 716 for fixing a second light unit 712 to the vehicle. The second light unit 712 may be an interior light unit that projects light through the first component 708, which may be formed of a clear or colored translucent thermoplastic polymer. The second light unit 712 may be secured to the vehicle using any number of known fixation methods. For example, the light unit may be secured to the vehicle by being snapped into place between the two fixation mechanisms 714, 716. The light unit may also be secured to the vehicle using screws, bolts, or other fastening members that can be fixed to the fixation mechanisms 714, 716.

Additionally, as depicted in FIG. 11, the tailgate including the plastic glazing 700 may further include a spoiler portion 720 and a supporting member 718. The supporting member 718 may be a part of a housing unit (e.g., the housing unit 724) that is disposed behind the plastic glazing 700 for supporting light units and the like. The spoiler portion 720 may be formed of an additional thermoplastic polymer and may be attached to the main body 702 using an adhesive or mechanical fastening system.

According to certain aspects of the disclosure, the tailgate assembles disclosed herein may also include additional layers on top of the thermoplastic polymer layers. For example, a layer for increasing scratch resistance may be added to an exterior surface of the plastic glazing. As another example, an additional layer for adding more support to the thermoplastic polymer layers may also be added to an interior surface of the plastic glazing. This additional layer may be formed of a plastic, a metal, or other material for increasing the structural strength of the tailgate.

It will be appreciated that the present disclosure may include any one and up to all of the following examples.

Example 1: A plastic glazing of a tailgate of a vehicle, the plastic glazing comprising: a first translucent component; a second translucent component molded onto the first translucent component, wherein the second translucent component comprises a color, wherein the plastic glazing is of one-piece molded plastic construction, wherein an overlapping portion of the first translucent component and the second translucent component forms a lens of a first light unit.

Example 2: The plastic glazing of Example 1, wherein the first translucent component is clear thermoplastic polymer.

Example 3: The plastic glazing of Example 2, wherein the clear thermoplastic polymer comprises polycarbonate.

Example 4: The plastic glazing of Example 1, wherein the first translucent component is a colored thermoplastic polymer.

Example 5: The plastic glazing of Example 4, wherein the clear thermoplastic polymer comprises polycarbonate.

Example 6: The plastic glazing of Example 1, wherein the first light unit is a tail lamp.

Example 7: The plastic glazing of Example 1, wherein the first light unit is turn signal light.

Example 8: The plastic glazing of Example 1, wherein the first light unit is a backup lamp.

Example 9: The plastic glazing of any of Examples 1-6, wherein the overlapping portion of the first translucent component and the second translucent component is configured to transmit a red light having a CIE (x,y) chromaticity value within a color space defined by a yellow boundary corresponding to $y=0.33$ and a purple boundary corresponding to $y=0.98-x$.

Example 10: The plastic glazing of any of Examples 1-5 and 7, wherein the overlapping portion of the first translucent component and the second translucent component is configured to transmit an amber light having a CIE (x,y) chromaticity value within a color space defined by a red boundary corresponding to $y=0.39$, a white boundary corresponding to $y=0.79-0.67x$, and a green boundary corresponding to $y=x-0.12$.

Example 11: The plastic glazing of any of Examples 1-5 and 8, wherein the overlapping portion of the first translucent component and the second translucent component is configured to transmit a white light having a CIE (x,y,) chromaticity value within a color space defined by a blue boundary corresponding to $x=0.31$, a yellow boundary corresponding to $x=0.50$, a first green boundary corresponding to $y=0.15+0.64x$, a purple boundary corresponding to $y=0.05+0.75x$, a second green boundary corresponding to $y=0.44$, and a red boundary corresponding to $y=0.38$.

Example 12: The plastic glazing of any of Examples 1-5, further comprising a third translucent component molded onto the first translucent component, wherein an overlapping portion of the first translucent component and the third translucent component forms a lens of a second light unit.

Example 13: The plastic glazing of Example 12, wherein the overlapping portion of the first translucent component and the second translucent component is configured to transmit a red light having a CIE (x,y) chromaticity value within a color space defined by a yellow boundary corresponding to $y=0.33$ and a purple boundary corresponding to $y=0.98-x$, and wherein the overlapping portion of the first translucent component and the third translucent component is configured to transmit an amber light having a CIE (x,y) chromaticity value within a color space defined by a red boundary corresponding to $y=0.39$, a white boundary corresponding to $y=0.79-0.67x$, and a green boundary corresponding to $y=x-0.12$.

Example 14: The plastic glazing of Example 13, wherein the overlapping portion of the first translucent component and the second translucent component and the overlapping portion of the first translucent component and the third translucent component are adjacent to each other.

Example 15: The plastic glazing of any of Examples 1-5, wherein the overlapping portion of the first translucent component and the second translucent component is configured to transmit a light having a percentage of rays that deviates by more than 2.5° from an incident ray of less than or equal to 30 percent.

Example 16: The plastic glazing of any of Examples 1-5, wherein the plastic glazing is attached to a housing unit that is configured to support the first light unit.

Example 17: The plastic glazing of Example 16, wherein the housing unit comprises a fiber-reinforced polymer.

Example 18: The plastic glazing of Example 17, wherein the fiber-reinforced polymer comprises polypropylene.

Example 19: The plastic glazing of any one of Examples 1-5, wherein at least one of the first translucent component and the second translucent component comprises a textured surface.

Example 20: The plastic glazing of Example 19, wherein the textured surface is configured to disperse light passing through the overlapping portion of the first translucent component and the second translucent component.

Example 21: The plastic glazing of any one of Examples 1-5, wherein the plastic tailgate is produced using a multi-shot injection molding process.

Example 22: The plastic glazing of Example 21, wherein the second translucent component is molded onto the first translucent component in a second shot of the multi-shot injection molding process.

Example 23: The plastic glazing of any one of Examples 1-5, wherein the second translucent component is disposed behind the first translucent component towards an interior of the vehicle.

Example 24: The plastic glazing of any one of Examples 1-5, wherein the first translucent component forms a raised marking.

Example 25: The plastic glazing of Example 24, wherein the raised marking is a logo.

Example 26: The plastic glazing of Example 25, wherein the logo is configured to be illuminated by a light unit disposed behind the plastic glazing towards an interior of the vehicle.

Example 27: The plastic glazing of any one of Examples 25 and 26, wherein the logo is formed during an injection molding process.

Example 28: The plastic glazing of any one of Examples 1-5, further comprising a laser mark.

Example 29: The plastic glazing of Example 28, wherein the laser mark is configured to be illuminated by a light unit disposed behind the plastic glazing towards an interior of the vehicle.

Example 30: The plastic glazing of any of Example 1-5, wherein a different portion of the first translucent component forms a lens of a third light unit.

Example 31: The plastic glazing of Example 30, wherein the third light unit is a puddle light.

Example 32: The plastic glazing of Example 30, wherein the third light unit is a license plate light.

Example 33: The plastic glazing of Example 30, wherein the third light unit is an interior light.

Example 34: A plastic glazing of a tailgate of a vehicle, the plastic glazing comprising: a first translucent component; a second translucent component molded onto the first translucent component, wherein the second translucent component comprises a color, wherein the plastic glazing is of one-piece molded plastic construction, wherein a portion of one or more of the first translucent component and the second translucent component forms a lens of a first molded light assembly.

Example 35: The plastic glazing of Example 34, wherein the first molded light assembly comprises a light source that is configured to generate a light that passes through an overlapping portion of the first translucent component and the second translucent component.

Example 36: The plastic glazing of any one of Examples 34-35, wherein the portion of one or more of the first translucent component and the second translucent component forming the lens of the first molded light assembly is configured to operate with the light source to produce a red light having a CIE (x,y) chromaticity value within a color space defined by a yellow boundary corresponding to y=0.33 and a purple boundary corresponding to y=0.98−x.

Example 37: The plastic glazing of any one of Examples 34-36, further comprising a third translucent component molded onto the first translucent component, wherein at least a portion of the third translucent component forms a lens of a second molded light assembly.

Example 38: The plastic glazing of any one of Examples 34-37, wherein the portion of the third translucent component forming the lens of the second molded light assembly is configured to operate with the second molded light assembly to produce an amber light having a CIE (x,y) chromaticity value within a color space defined by a red boundary corresponding to y=0.39, a white boundary corresponding to y=0.79−0.67x, and a green boundary corresponding to y=x−0.12.

Example 39: The plastic glazing of any one of Examples 34-38, wherein the portion of the third translucent component forming the lens of the second molded light assembly is configured to operate with the second molded light assembly to produce a white light having a CIE (x,y) chromaticity value within a color space defined by a blue boundary corresponding to x=0.31, a yellow boundary corresponding to x=0.50, a first green boundary corresponding to y=0.15+0.64x, a purple boundary corresponding to y=0.05+0.75x, a second green boundary corresponding to y=0.44, and a red boundary corresponding to y=0.38.

Example 40: The plastic glazing of any one of Examples 34-39, wherein a different portion of the first translucent component forms a lens of a third molded light assembly, wherein the third molded light assembly comprises one of a puddle light, a license plate light, and an interior light.

Example 41: The plastic glazing of any one of Examples 34-40, wherein the portion of one or more of the first translucent component and the second translucent component forming the lens of the first molded light assembly and the portion of the third translucent component forming the lens of the second molded light assembly are adjacent to each other.

Example 42: The plastic glazing of any one of any one of Examples 34-41, wherein the plastic glazing is attached to a housing unit that is configured to support the first molded light assembly, wherein the housing unit comprises a fiber-reinforced polymer.

Example 43: The plastic glazing of any one of Examples 34-42, wherein at least one of the first translucent component and the second translucent component comprises a textured surface configured to disperse light passing through the overlapping portion of the first translucent component and the second translucent component.

Example 44: The plastic glazing of any one of Examples 34-43, wherein the overlapping portion of the first translucent component and the second translucent component is configured to transmit a light having a percentage of rays that deviates by more than 2.5° from an incident ray of less than or equal to 30 percent.

Example 45: The plastic glazing of any one of Examples 34-44, wherein the plastic glazing is attached to a housing unit that is configured to support the first molded light assembly.

Example 46: The plastic glazing of any one any of Examples 34-45, wherein the plastic tailgate is produced using a multi-shot injection molding process.

Example 47: The plastic glazing of any one of Examples 34-46, wherein the second translucent component is molded onto the first translucent component in a second shot of the multi-shot injection molding process.

Example 48: The plastic glazing of any one of Examples 34-47, wherein the first translucent component forms a raised marking.

In general, systems and methods disclosed herein may alternately comprise, consist of, or consist essentially of, any appropriate components herein disclosed. The invention may additionally, or alternatively, be designed so as to be devoid, or substantially free, of any components used in the prior art compositions or that are otherwise not necessary to the achievement of the function and/or objectives of the present invention.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Aspects of the present disclosure described in connection with illustrated embodiments have been presented by way of illustration, and the present disclosure is therefore not intended to be limited to the disclosed embodiments. Furthermore, the structure and features of each embodiment described herein can be applied to the other embodiments described herein. Accordingly, those skilled in the art will realize that the present disclosure is intended to encompass all modifications and alternative arrangements included within the spirit and scope of the present disclosure, as set forth by the appended claims.

What is claimed is:

1. A plastic glazing of a tailgate of a vehicle, the plastic glazing comprising:

a first translucent component forming a rear window of the vehicle;

a second translucent component molded onto the first translucent component, wherein the second translucent component comprises a color and wherein an overlapping portion of the first component and the second component forms a colored portion; and a non-translucent component forming a blackout region adjacent to the colored portion, wherein the first translucent component, the second translucent component and the non-translucent component are formed of a thermoplastic polymer, wherein the plastic glazing is of one-piece molded plastic construction, and wherein the colored portion forms a lens of a first molded light assembly of the tailgate.

2. The plastic glazing of claim 1, wherein the first molded light assembly comprises a light source that is configured to generate a light that passes through an overlapping portion of the first translucent component and the second translucent component.

3. The plastic glazing of claim 2, wherein the colored portion forming the lens of the first molded light assembly is configured to operate with the light source to produce a red light having a CIE (x,y) chromaticity value within a color space defined by a yellow boundary corresponding to y=0.33 and a purple boundary corresponding to y=0.98−x.

4. The plastic glazing of claim 3, further comprising a third translucent component molded onto the first translucent component, wherein at least a portion of the third translucent component forms a lens of a second molded light assembly.

5. The plastic glazing of claim 4, wherein the portion of the third translucent component forming the lens of the second molded light assembly is configured to operate with the second molded light assembly to produce an amber light having a CIE (x,y) chromaticity value within a color space defined by a red boundary corresponding to y=0.39, a white boundary corresponding to y=0.79−0.67x, and a green boundary corresponding to y=x−0.12.

6. The plastic glazing of claim 5, wherein the portion of one or more of the first translucent component and the second translucent component forming the lens of the first molded light assembly and the portion of the third translucent component forming the lens of the second molded light assembly are adjacent to each other.

7. The plastic glazing of claim 4, wherein the portion of the third translucent component forming the lens of the second molded light assembly is configured to operate with the second molded light assembly to produce a white light having a CIE (x,y) chromaticity value within a color space defined by a blue boundary corresponding to x=0.31, a yellow boundary corresponding to x=0.50, a first green boundary corresponding to y=0.15+0.64x, a purple boundary corresponding to y=0.05+0.75x, a second green boundary corresponding to y=0.44, and a red boundary corresponding to y=0.38.

8. The plastic glazing of claim 7, wherein a different portion of the first translucent component forms a lens of a third molded light assembly, wherein the third molded light assembly comprises one of a puddle light, a license plate light, and an interior light.

9. The plastic glazing of claim 1, wherein at least one of the first translucent component and the second translucent component comprises a textured surface configured to disperse light passing through the overlapping portion of the first translucent component and the second translucent component.

10. The plastic glazing of claim 1, wherein the overlapping portion of the first translucent component and the second translucent component is configured to transmit a light having a percentage of rays that deviates by more than 2.5° from an incident ray of less than or equal to 30 percent.

11. The plastic glazing of claim 1, wherein the plastic glazing is attached to a housing unit that is configured to support the first molded light assembly.

12. The plastic glazing of claim 1, wherein the plastic glazing is produced using a multi-shot injection molding process.

13. The plastic glazing of claim 1, wherein the second translucent component is molded onto the first translucent component in a second shot of a multi-shot injection molding process.

14. The plastic glazing of claim 1, wherein the first translucent component forms a raised marking.

* * * * *